US008008082B2

(12) United States Patent
Howland et al.

(10) Patent No.: US 8,008,082 B2
(45) Date of Patent: Aug. 30, 2011

(54) SOLUTION DISPENSING SYSTEM

(76) Inventors: David R. Howland, Aptos, CA (US); Matt Hayas, Cincinnati, OH (US)

( * ) Notice: Subject to any disclaimer, the term of this patent is extended or adjusted under 35 U.S.C. 154(b) by 1246 days.

(21) Appl. No.: 11/437,481

(22) Filed: May 18, 2006

(65) Prior Publication Data

US 2007/0269894 A1 Nov. 22, 2007

(51) Int. Cl.
*G01N 35/02* (2006.01)

(52) U.S. Cl. ......... 436/50; 422/403; 422/76; 422/82.02; 422/82.03; 436/149; 436/150

(58) Field of Classification Search ............... 422/68.01, 422/76, 82.01–82.03, 403, 50; 436/149, 436/150

See application file for complete search history.

(56) References Cited

U.S. PATENT DOCUMENTS

| | | | |
|---|---|---|---|
| 6,418,958 B1 | 7/2002 | Rossi et al. | |
| 6,820,661 B1 | 11/2004 | Heimert | |
| 2005/0107013 A1 * | 5/2005 | Gadini et al. | 451/42 |

* cited by examiner

*Primary Examiner* — Jyoti Nagpaul

(74) *Attorney, Agent, or Firm* — Wood, Herron, & Evans, LLP

(57) ABSTRACT

A method and system for switching the dispensing of a first solution from a first vessel to dispensing a second solution from a second vessel when a parameter of the first solution crosses a threshold is described. In one embodiment, a fluid dispensing apparatus includes a first vessel and a second vessel. The first vessel includes an output conduit adapted to dispense the first solution from the first vessel into a fluid receiving region. The second vessel includes an output conduit adapted to dispense the second solution from the second vessel into the fluid receiving region. The apparatus includes a first sensor positioned to measure a parameter of the first solution before the first fluid enters the fluid receiving region. The apparatus also includes a second sensor positioned to measure a parameter of the second solution before the second solution enters the fluid receiving region.

5 Claims, 8 Drawing Sheets

SOLUTION DISPENSING SYSTEM

BACKGROUND

The present invention relates in general to solid chemical dispensing systems, and in particular to various embodiments of solid chemical dispensing systems that include multiple vessels used to dispense chemical solutions.

Generally, solid chemical dispensing systems are used to add chemicals to minimize and/or inhibit corrosion in boiler systems, cooling towers, fluid processing systems, etc. Such solid chemical dispensing systems generally employ vessels that contain a dissolvable solid chemical that is mixed with a fluid, such as water, to form a corrosion inhibiting/prevention solution. Typically, the vessels have an output conduit used for dispensing the solution into a holding reservoir, or directly into fluid processing systems.

Conventional solid chemical dispensing systems often use water under pressure that is sprayed into a vessel containing a dissolvable solid chemical. The force of the water, and agitation, mix the chemical with the water inside the vessel to form the solution. While, conventional solid chemical dispensing systems have proven effective in providing solutions that reduce the amount of corrosion in boilers, cooling towers, etc., the solution's effectiveness is dramatically reduced when the dissolvable solid chemical is depleted. Once the dissolvable solid chemical in a vessel is completely dissolved, the dissolvable solid chemical is replaced, or another vessel containing dissolvable solid chemical is used in its place.

The chemical dispensing industry has provided multi-vessel solid chemical dispensing systems to help resolve the depletion problem. Such multi-vessel solid chemical dispensing systems provide switching between vessels to maintain the solution concentration. For some conventional multi-vessel solid chemical dispensing systems, when a vessel in use is depleted of its dissolvable solid chemical, a controller automatically switches to another vessel containing dissolvable solid chemical. In order to determine when to switch between vessels, conventional multi-vessel systems measure conductivity in a reservoir or sump holding the solution. As the conductivity of the solution in the reservoir changes with respect to the amount of dissolvable solid chemical remaining, the multi-vessel system switches between vessels when the conductivity measurement in the reservoir reaches a predetermined conductivity threshold.

Unfortunately, such conventional multi-vessel systems that measure conductivity in the reservoir as a guide, measure the conductivity against a predefined set point value without regard to the change in conductivity in the water used to create the solution. As conductivity may dramatically change between different sources of water, solution concentrations may vary, and therefore the effectiveness of the conventional multi-vessel systems may vary as well.

Therefore, what is needed is a multi-vessel solid chemical dispensing system that provides a consistent and uniform solution concentration that is easy to use and integrate into fluid systems.

BRIEF SUMMARY

Embodiments of the invention are directed to a multi-vessel chemical dispensing system. One embodiment of the present invention is directed to an apparatus that includes at least two vessels, where one vessel, or another vessel, is selected to dispense chemical solutions with respect to a property of the solutions being dispensed. Each vessel includes an inlet for receiving incoming fluid to mix with one or more chemicals to form and contain a solution therein. The apparatus also includes a plurality of sensors, each dedicated to measure a property of a solution associated with one of the vessels with respect to a reference measurement. Each sensor is positioned to measure the property of the solution before is reaches a fluid receiving region, such as a sump or reservoir. When dispensing solution from a vessel, if a measurement threshold is reached with respect to a reference measurement, a controller switches incoming fluid from the vessel dispensing the solution to another vessel. The other vessel receives the incoming fluid and then dispenses its solution. If a threshold of the property of the other solution being dispensed from the other vessel is reached with respect to the reference measurement, the controller switches the flow of incoming fluid from the other vessel dispensing the solution to other vessels, one at a time, until a vessel containing sufficient chemicals is found to form a solution. If no vessel is found, then the controller may control the apparatus to dispense fluid from a plurality of vessels, or no vessels, until one or more of the vessels are refilled with chemicals.

In one embodiment, the present invention provides a method which includes delivering a fluid to a first vessel of at least two vessels to form a first solution within the first vessel, dispensing the first solution through a fluid conduit coupled to an outlet of the first vessel into a fluid output region, measuring a property of the first solution before the first solution reaches the fluid output region, and switching the fluid delivery from the first vessel to a second vessel of at least two vessels when the property of the first solution crosses a predetermined threshold level.

In one embodiment, the present invention provides an apparatus which includes a first vessel adapted to contain a first solution, a second vessel adapted to contain a second solution, a first conduit coupling the first vessel to a fluid receiving region, a second conduit coupling the second vessel to the fluid receiving region, a first sensor positioned to measure a first property of the first solution before the first solution reaches the fluid receiving region, a second sensor positioned to measure a second property of the second solution before the solution reaches the fluid receiving region, and a controller. The controller is adapted to control the dispensing of the first solution into the fluid receiving region after a threshold for first property is met, and is adapted to control the dispensing of the second solution into the fluid receiving region after a threshold for the second property is met.

In one embodiment, the present invention provides a method which includes positioning a first sensor proximate a first solution, applying a first signal to the first sensor to generate a second signal, wherein the magnitude of the second signal varies as a function of a first property of the first solution. The method further includes positioning a second sensor proximate a second solution and applying the first signal to the second sensor to generate a third signal, where the magnitude of the third signal varies as a function of a second property of the second solution, and comparing the second signal and third signal to a reference signal to determine whether to dispense the first solution or the second solution.

In one embodiment, the present invention provides a circuit which includes a signal monitoring circuit configured to monitor a property of a first signal from a first sensor positioned to monitor a property of the first solution, where the property of the first signal varies as a function of the property of the first solution. The signal monitoring circuit monitors a second signal from a second sensor positioned to monitor a property of a second solution, where a property of the second signal varies as a function of the property of the second solution. The signal monitoring circuit includes a control circuit configured to compare the property of the first signal, and the property of the second signal, to a property of a reference signal to determine whether to provide a first control signal for dispensing the first solution, or provide a second control signal for dispensing the second solution.

These and other embodiments of the present invention are described in further detail below.

Figure 1:
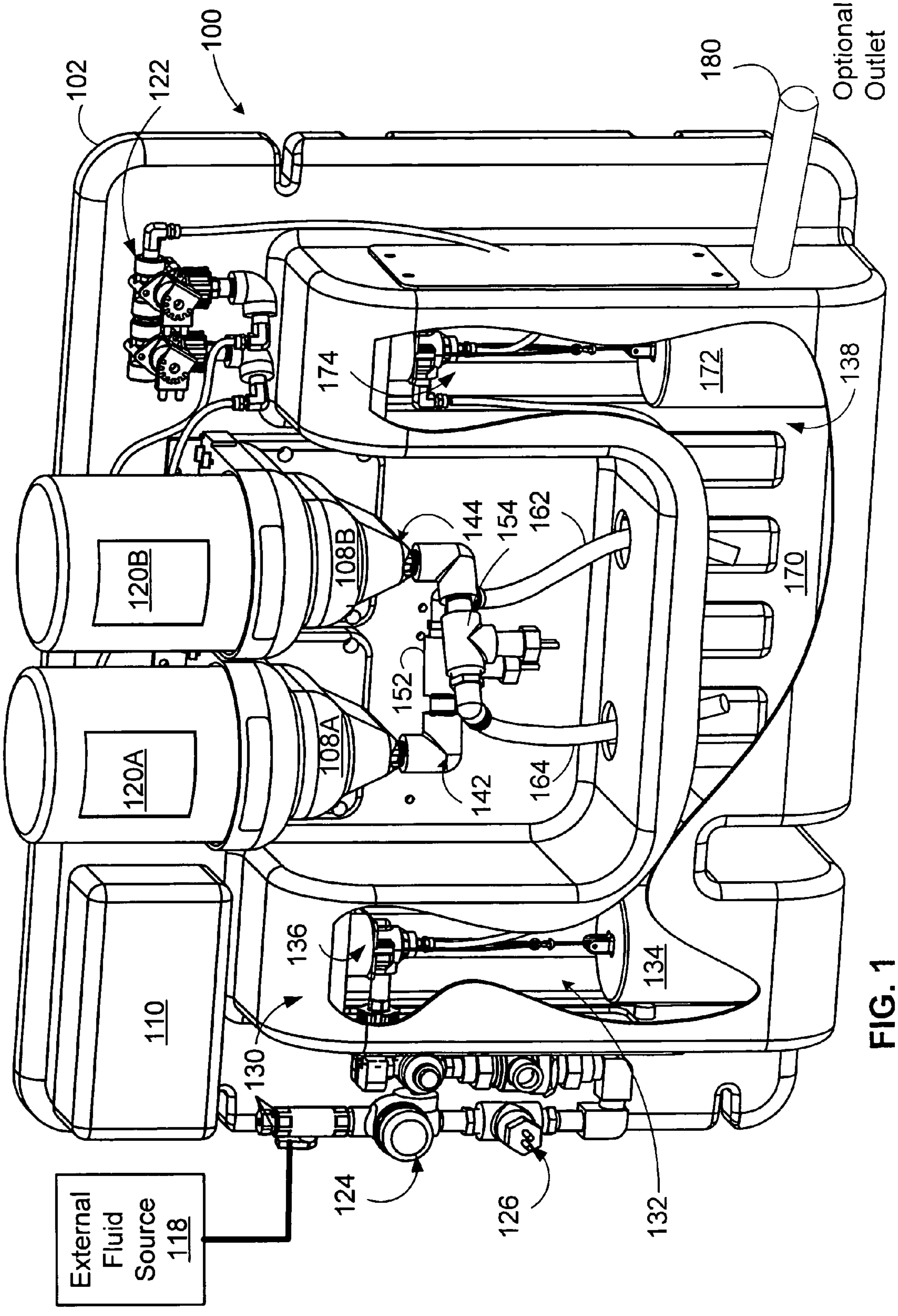
FIG. 1 is a perspective view illustrating one embodiment of a multi-vessel chemical dispensing system in accordance with embodiments of the invention.

These and other embodiments of the invention are described in further detail below.

DETAILED DESCRIPTION OF EXEMPLARY EMBODIMENTS

Embodiments of the invention are directed to a multi-vessel chemical dispensing system. In one embodiment a multi-vessel chemical dispensing system is employed to dispense one or more chemical solutions used by cooling towers, boilers, etc., to protect them from degradation due to oxidation, corrosion, hard water scale, and the like. The solution may be derived by mixing a fluid such as water with a dissolvable chemical compound, or mixture of compounds. To create a solution, the multi-vessel chemical dispensing system includes two or more vessels that contain one or more dissolvable chemical compounds. A fluid is coupled from an external source into one of the vessels selected for dispensing the solution. The solution is generated through agitation of the incoming fluid with the dissolvable chemical compounds in the selected vessel. Each vessel contains an output conduit used to dispense the solution from a selected one of the vessels to a solution receiving region, such as a sump or reservoir.

In one embodiment, a controller may be used to receive signals from associated sensors disposed in contact with and/or adjacent to the solution being dispensed from a respective vessel of a plurality of vessels. The sensors output and/or condition a signal used to detect a property of the solution, such as conductivity or opacity, being dispensed from a respective vessel before it is dispensed into the solution receiving region. The signal is used by the controller to determine if the solution dispensed from the vessel is within a predefined range of a property of the incoming fluid used to create the solution. If so, the vessel is allowed to dispense its solution into the solution receiving region. However, if the controller determines the solution from the vessel is outside the predefined range, the controller switches the incoming fluid and dispensing the solution, from that vessel, to another vessel containing dissolvable chemical compounds. Another sensor disposed adjacent to and/or in contact with a second solution being dispensed from the other vessel is used to measure the property of the second solution being dispensed before the solution is dispensed into the fluid receiving region. If the second solution from the other vessel is within the predefined range, the other vessel is allowed to dispense the second solution. However, if the controller determines the solution from the second vessel is outside a predefined range, the controller switches dispensing the solution from the other vessel to another vessel containing dissolvable chemical compounds to generate and dispense another solution into the solution receiving region.

For clarity, water is described herein, however, one skilled in the art will appreciate that other fluids may be used within the scope of the present invention. For example, the fluid may be a premixed solution from an external container.

FIG. 1 is a perspective view illustrating one embodiment of a multi-vessel chemical dispensing system 100. In one embodiment, multi-vessel chemical dispensing system 100 includes a body 102, a controller 110, and a fluid inlet control 124 coupled to a fluid selection control 122 (e.g., valves) which selectively couples incoming fluid from fluid inlet control 124, to at least two vessels such as a vessel 120A and a vessel 120B, as illustrated. Body 102 may be formed from materials such as metal, plastic, and the like, which are capable of supporting components and operations of multi-vessel chemical dispensing system 100.

In one embodiment, fluid inlet control 124 is configured to control the incoming fluid from an external fluid source 118, such as an external container, fluid system, and the like, to fluid selection control 122. Fluid inlet control 124 may contain one or more valves, solenoids, and fluid control mechanisms capable of controlling the flow of the incoming fluid. Fluid inlet control 124 also contains a sensor 126 disposed adjacent to and/or in contact with the incoming fluid. Such positioning allows sensor 126 to measure one or more properties of the incoming fluid, such as conductivity and opacity, before it is delivered to fluid selection control 122. Fluid selection control 122 is configured to select which vessel, i.e., vessel 120A or vessel 120B, receives the incoming fluid from fluid inlet control 124. Fluid selection control 122 may contain one or more valves, solenoids, fluid control mechanisms, and the like, capable of controlling the flow of incoming fluid from the fluid inlet control 124 to vessel 120A or vessel 120B.

Vessel 120A and vessel 120B are configured in embodiments of the present invention to mix the incoming fluid with dissolvable chemicals to form a solution as is described below. Vessel 120A and vessel 120B may be any suitable container adapted to mix and dispense solutions. For example, Vessel 120A and vessel 120B may be glass containers detachably mounted to a solid bowl assembly 108A and 108B. Vessel 120A and vessel 120B include a fluid dispensing assembly 142 and a fluid dispensing assembly 144, respectively. Fluid dispensing assembly 142 and fluid dispensing assembly 144 are used to dispense solutions contained in each respective vessel 120A and 120B, into a solution receiving region 170. Multi-vessel chemical dispensing system 100 optionally includes a solution outlet 180 for dispensing the solution from the solution receiving region 170 and/or for direct connection to a fluid system, boiler, or cooling tower, for example.

To control the amount of solution held in solution receiving region 170, multi-vessel chemical dispensing system 100 may include two float assemblies: an optional overflow float assembly 136, disposed in an a fluid reservoir 130, and a primary float assembly 174 disposed in a fluid reservoir 138 portion of solution receiving region 170. Overflow float assembly 136 and primary float assembly 174 may be employed to ensure that solution receiving region 170 stores a predetermined amount of solution dispensed from vessel 120A and vessel 120B. For example, when a predetermined amount of solution has been stored in solution receiving region 170, primary float assembly 174 uses a float 172 to shut off the flow of fluid from overflow float assembly 136 to fluid control 122. For example, float 172 may float on a solution to a given position within fluid reservoir 138 to close a valve inline with the flow of the incoming fluid, shutting the flow of incoming fluid off from overflow float assembly 136, thereby preventing the further dispensing of solution from vessel 120A or vessel 120B.

In one alternative embodiment, to prevent overflow, when a solution stored in solution receiving region 170 exceeds an overflow level, float assembly 136 uses a float 134 to shut off the flow of fluid from fluid inlet control 124 to prevent the overflow. In one embodiment, float 134 may float on a solution to a given position within fluid reservoir 130. At such a position, float 134 may then operate float assembly 136 which closes a valve disposed inline with the flow of incoming fluid from fluid inlet control 124, to shut the flow of fluid off to primary float assembly 174, and therefore to fluid control 122.

In one embodiment, fluid dispensing assembly 142 includes a sensor 152, and fluid dispensing assembly 144 includes a sensor 154. Sensor 152 and sensor 154 may be disposed adjacent to and/or in contact with a solution being dispensed from a respective vessel 120A and vessel 120B, before the solution is dispensed into solution receiving region 170. For example, sensor 152 may be disposed in or adjacent to an outlet conduit 162 coupled to an outlet of vessel 120A. Similarly, sensor 154 may be disposed in or adjacent to an outlet conduit 164 coupled to an outlet of vessel 120B. Such positioning allows sensor 152 to measure one or more properties of the solution being dispensed from vessel 120A, before it is delivered to solution receiving region 170. Likewise, such positioning allows sensor 154 to measure one or more properties of the solution being dispensed from vessel 120B, before it is delivered to solution receiving region 170. Advantageously, measuring the property of the solution prior to being dispensed into solution receiving region 170 allows for a more accurate assessment of the property of each solution with respect to vessel 120A and vessel 120B.

Controller 110 may be virtually any type of integrated circuit and/or data processing system such as a microprocessor, field programmable gate array (FPGA), application specific integrated circuit (ASIC), and the like, that may be configured to perform embodiments of the present invention to advantage. In one embodiment, controller 110 includes a Central Processing Unit (CPU) and a computer readable media such as a memory. The CPU may be under the control of an operating system that may be disposed in memory. Virtually any operating system or portion thereof supporting the configuration functions disclosed herein may be used. In one embodiment, the CPU may be hardwired logic circuitry, and the like, adapted to operate controller.

In one embodiment, controller 110 includes a circuit and software instructions (e.g., computer code) to control the operation of multi-vessel chemical dispensing system 100. For example, controller 110 may be configured to control fluid inlet control 124 and fluid selection control 122 based on data received from sensor 126, fluid dispensing assembly 142, fluid dispensing assembly 144, float assembly 136, and float assembly 174. For example, controller 110 may operate fluid inlet control 124 to allow, or not allow, fluid to be coupled to fluid selection control 122 with respect to a position of float 134 of float assembly 136 disposed in fluid reservoir 130.

In other embodiments, as will be described in more detail below, controller 110 may be configured to operate fluid selection control 122, to select which vessel, vessel 120A or 120B, neither, or both, receive fluid in order to create and dispense a solution into solution receiving reservoir 170. For example, controller 110 may control fluid selection control 122 to switch the incoming fluid being coupled to vessel 120A to vessel 120B when a predetermined property of the solution being dispensed from vessel 120A exceeds a predefined threshold limit.

Figure 2:
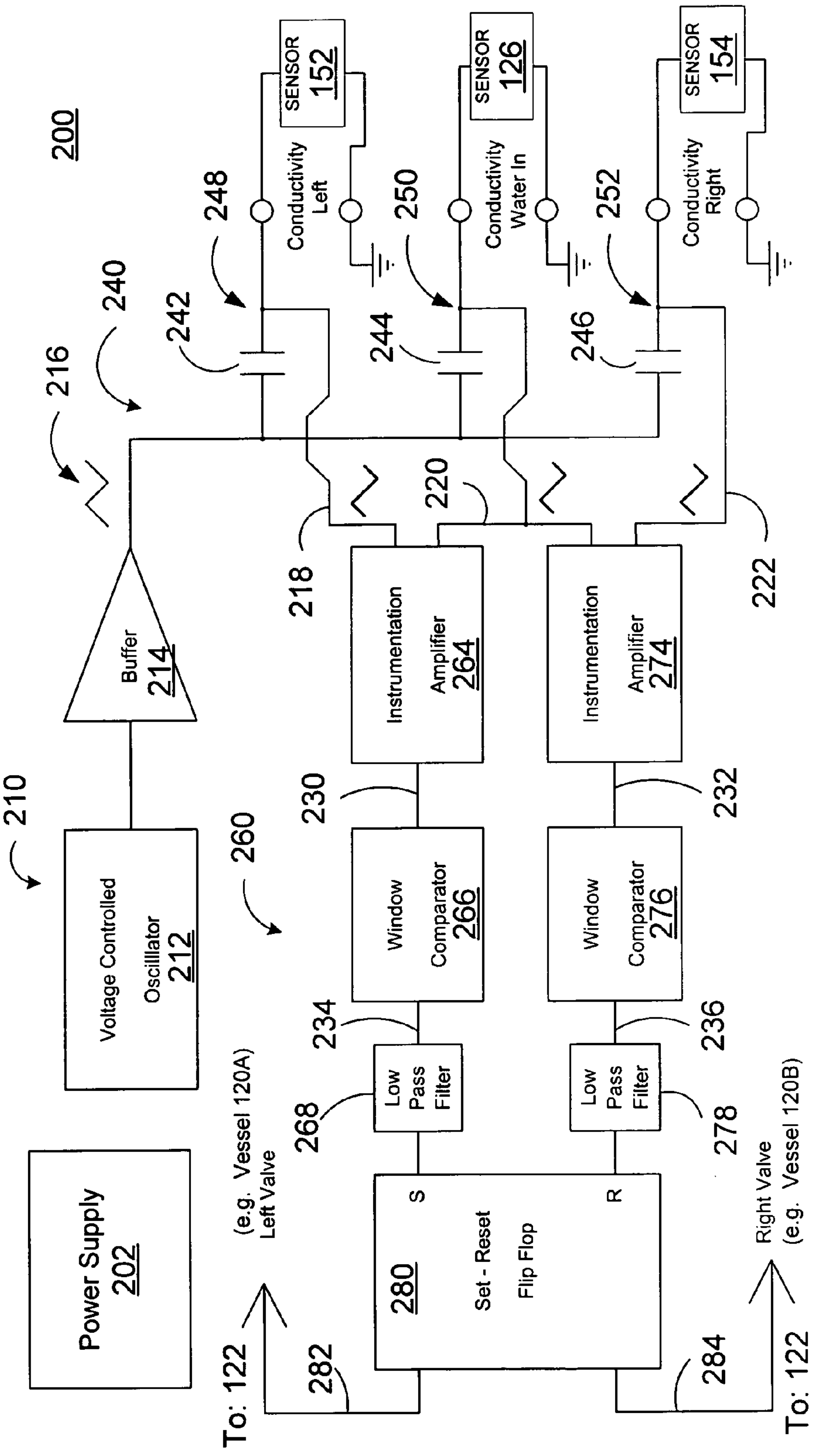
FIG. 2 is a high-level block diagram illustrating one embodiment of a circuit to control dispensing a solution in accordance with embodiments of the invention.
Figure 3:
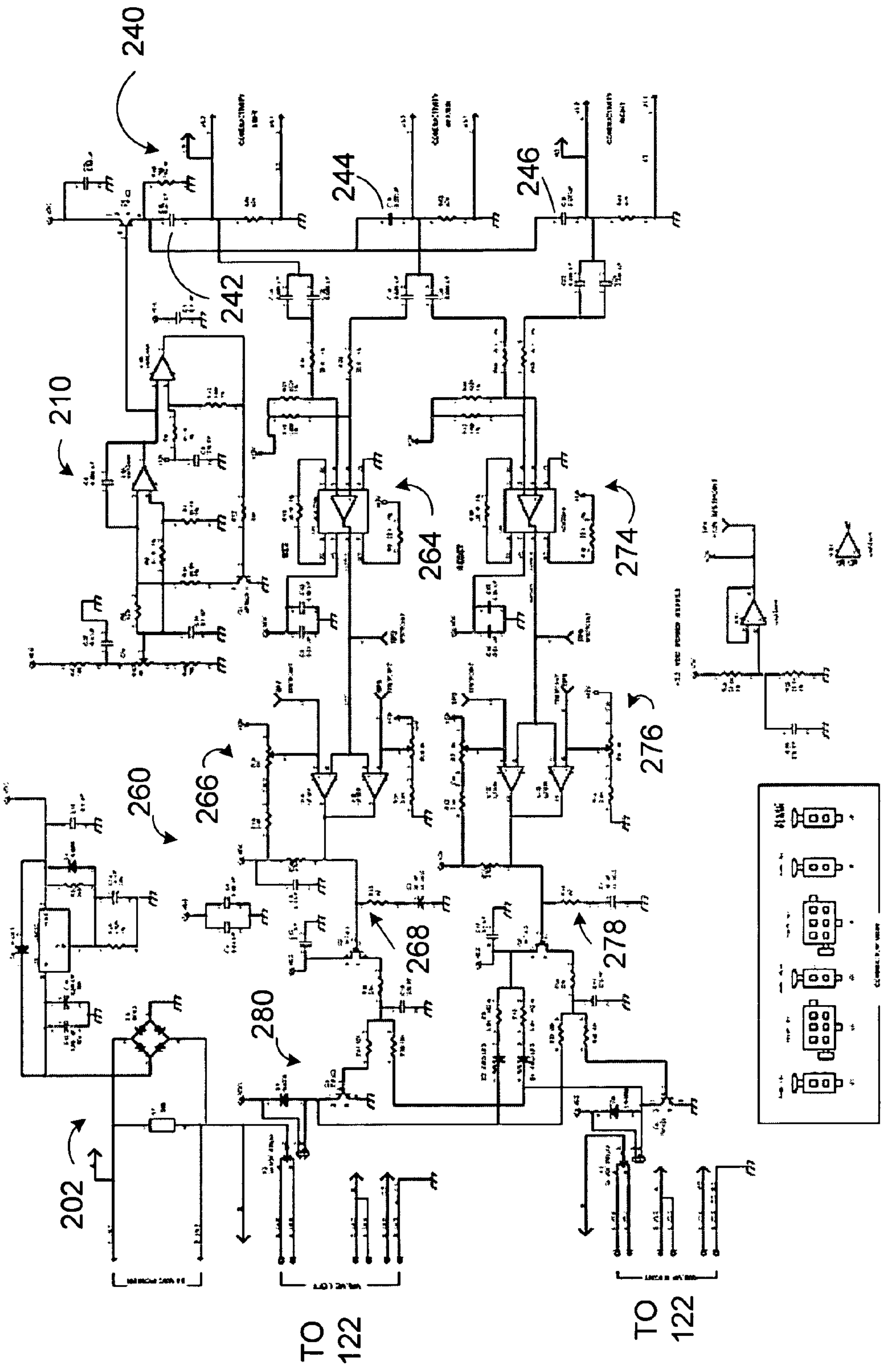
FIG. 3 is a schematic illustrating one embodiment of a circuit to control dispensing a solution in accordance with embodiments of the invention.
Figure 4:
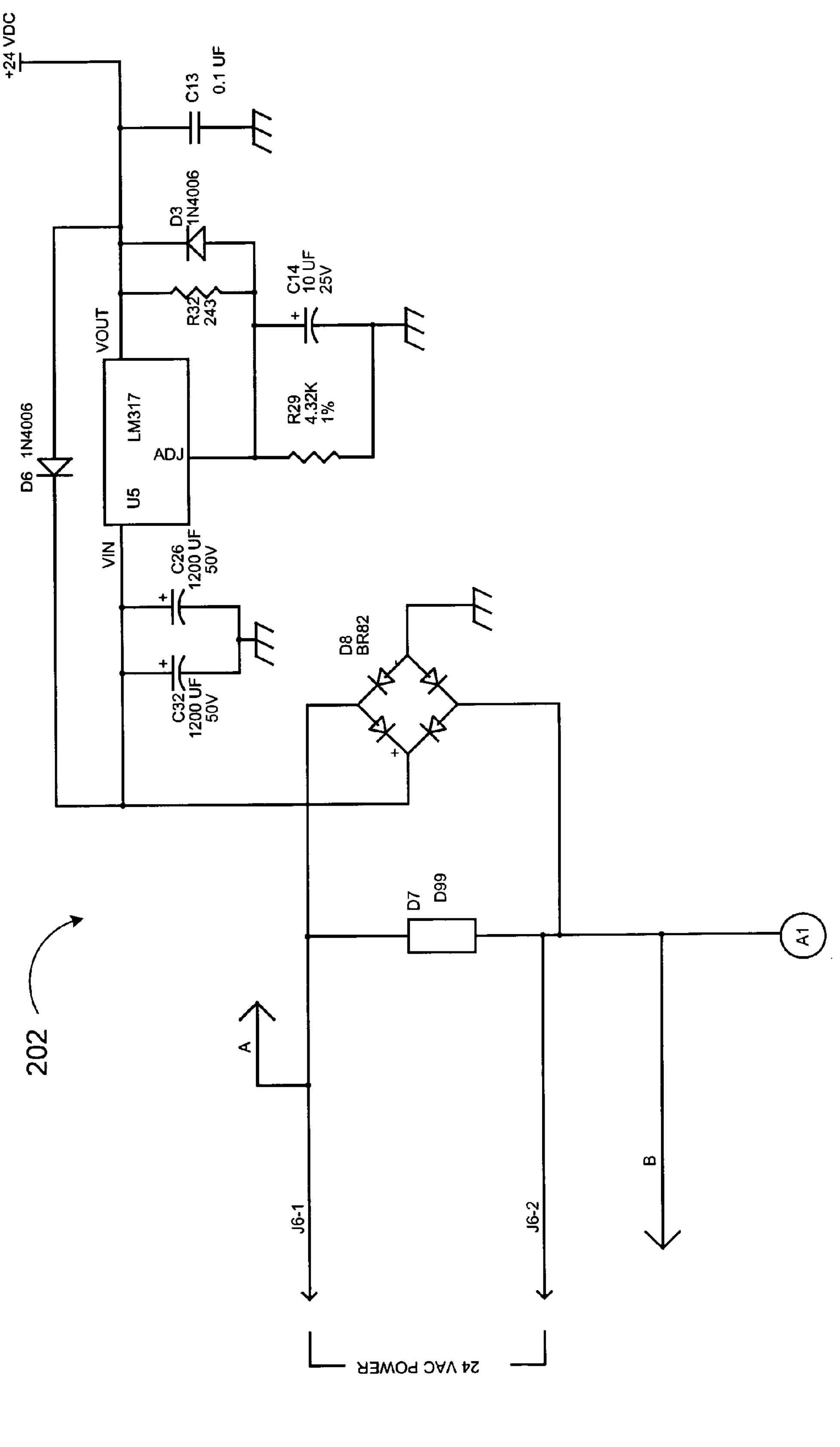
FIGS. 4-6 illustrate a schematic of one embodiment of the circuit of FIG. 3 to control dispensing a solution in accordance with embodiments of the invention.
Figure 5:
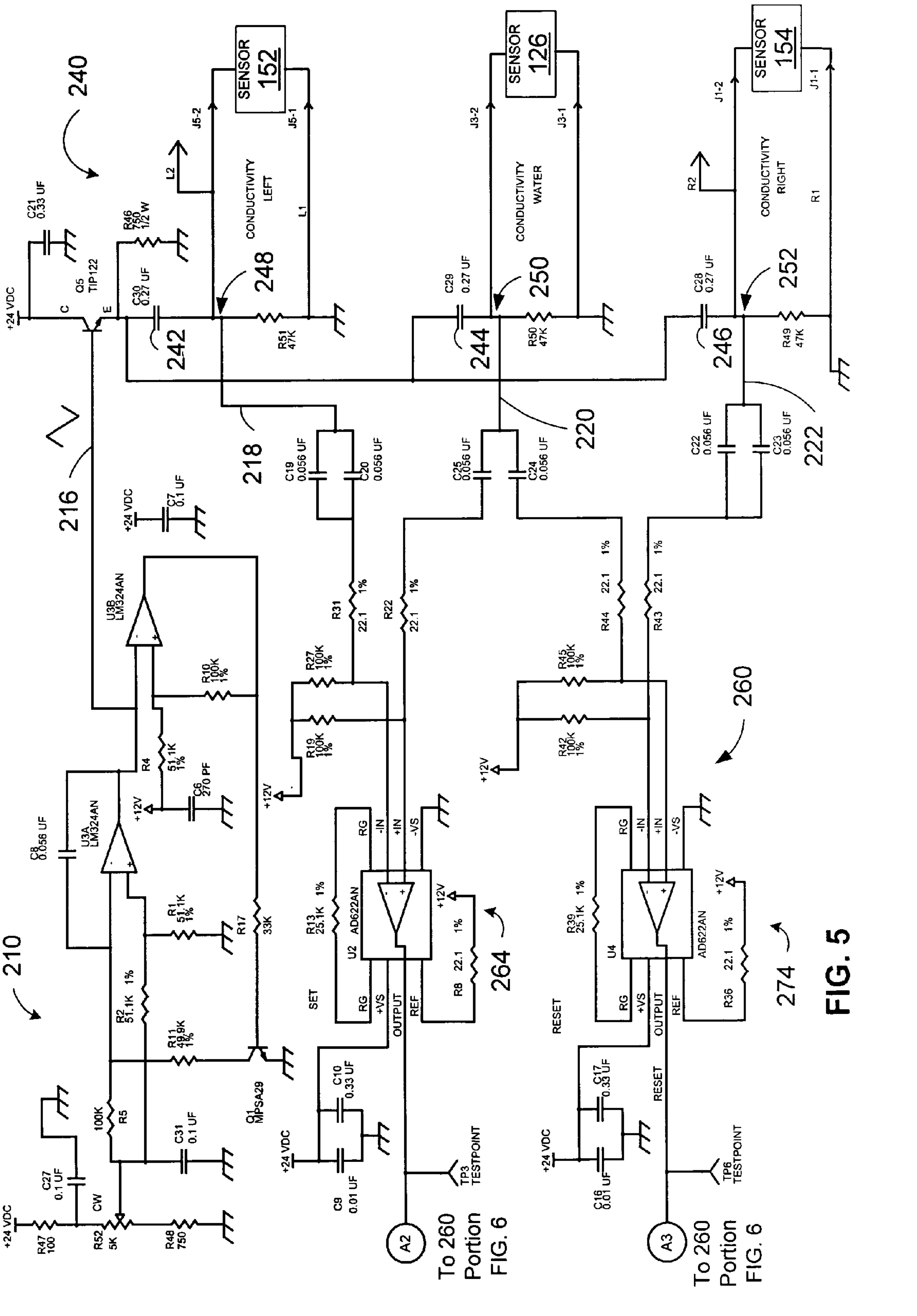

FIG. 2 is a high-level block diagram illustrating one embodiment of a circuit 200 to control dispensing a solution. FIGS. 3-5 are a schematic illustrating one embodiment of circuit 200. In one embodiment, controller 110 includes circuit 200. Circuit 200 may include a power supply 202, an oscillator 210, a solution probe circuit 240, and a solution measurement circuit 260. Power supply 202 may be any type of power supply suitable for operation of multi-vessel chemical dispensing system 100. For example, as illustrated in FIG. 4, power supply 202 may utilize power from an external power supply, such as 24V AC power. In one embodiment, the 24V AC power is rectified to a 24V DC voltage using rectifier D8 as is known. The DC voltage is filtered by capacitors C26 and C32 and then regulated by U5 to generate a 24V DC output voltage as will be apparent to one skilled in the art.

In one embodiment, oscillator 210 generates a signal such as a triangle alternating current (AC) waveform, sine-wave, square-wave waveform, saw-tooth waveform, and the like. Oscillator 210 may generate an output signal 216 using a variety of oscillator circuit configurations, including voltage controlled oscillators (VCO), resonance circuits, and the like. In one embodiment, oscillator 210 is configured as a VCO 210 capable of generating a signal 216 of about between 500 Hz and 10 kHz which is passed through a buffer amplifier 214 to solution probe circuit 240, for stimulus thereof. For example, referring to FIG. 3 and FIG. 5, an oscillator 210 may be formed by forming a feedback loop including U3A, U3B, and Q1. As illustrated, signal 216 may be tapped from the feedback loop portion between operational amplifier U3A and operational amplifier U3B, which is then amplified by transistor Q5.

Solution probe circuit 240 is configured in embodiments of the present invention to AC couple signal 216 from buffer amplifier 214 to node 248, node 250, and node 252 through respective capacitor 242, capacitor 244, and capacitor 246. Node 248, node 250, and node 252 are electrically positioned between respective input terminals of sensor 126, sensor 152, and sensor 154, and terminals of associated capacitor 242, capacitor 244, and capacitor 246. Therefore, during operation of oscillator 210, signal 216 stimulates input terminals of sensor 126, sensor 152, and sensor 154.

In one embodiment, sensor 126, sensor 152, and sensor 154 provide an electrical impedance to signal 216 that varies as a function of one or more properties of a solution disposed adjacent to, or in contact with, sensor 126, sensor 152, and sensor 154. For example, electrical impedance may vary with a property of the solution such as conductivity or opacity. In one embodiment, as the properties for each solution vary, the electrical impedance of the sensors also varies. As node 248, node 250, and node 252 are disposed between a respective sensor 126, sensor 152, and sensor 154, and respective capacitor 242, capacitor 244, and capacitor 246, a signal division for each node may be realized that varies as a function of such changes in impedance. For example, capacitor 242 is coupled in series with sensor 152 via node 248. Capacitor 242 acts as a first impedance, and sensor 152 acts as another impedance to form the signal divider with respect to node 248. In one embodiment, for a given fixed frequency of signal 216, the signal on node 248 will vary (e.g., be divided) as a function of the change of impedance of sensor 152.

Sensor 126, sensor 152, and sensor 154 may include any suitable type of sensors. For example, sensor 126, sensor 152, and sensor 154 may be electrical contact sensors that change impedance based on the conductivity of a solution they are in contact with. Sensor 126, sensor 152, and sensor 154 may also be optical sensors that measure the opacity of the solution. It is also contemplated that sensor 126, sensor 152, and sensor 154 may be other types of sensors such as magnetic sensors, density sensors, and sensors that include wireless transmitter and receiver combinations that vary in resistance in response to a magnitude of a wireless signal transmitted through and adsorbed and/or attenuated by the solution being measured.

Solution measurement circuit 260 receives the divided portion of signal 216, i.e., a signal 218, a signal 220, and a signal 222, from node 248, node 250, and node 252, respectively. Solution measurement circuit 260 processes signal 218, signal 220, and signal 222 to control fluid selection control 122. For example, in one embodiment, solution measurement circuit 260 processes signal 218, signal 220, and signal 222 to determine which vessel 120A or vessel 120B will be selected to receive the incoming fluid from fluid selection control 122, and therefore mix and dispense a solution. While solution measurement circuit 260 is described herein as processing signal properties such as current or voltage magnitudes, it will be appreciated by those skilled in the art that other signal properties may be processed such as slew rate, noise, frequency, phase, power, waveform shape, and the like.

In one embodiment, solution measurement circuit 260 includes an instrumentation amplifier 264, an instrumentation amplifier 274, a window comparator 266, another window comparator 276, a low pass filter 268, another low pass filter 278, and a set-reset flip-flop 280. In embodiments of the present invention, instrumentation amplifier 264 includes an input connected to node 248 for receiving signal 218, and an input connected to node 250 for receiving signal 220. Instrumentation amplifier 274 includes an input connected to node 250 for receiving signal 220, and an input connected to node 252 for receiving signal 222. Instrumentation amplifier 264 and instrumentation amplifier 274 may use any type of amplifiers, electrical components, or integrated circuits, such as operational amplifiers, and/or discrete components, and the like, to process and amplify signals. For example, as illustrated in FIG. 5, instrumentation amplifier 264, and instrumentation amplifier 274 include operational amplifier U2 and operational amplifier U4, respectively.

As signal 218, signal 220, and signal 222 are derived from signal 216, they generally remain in a fixed phase relationship. Instrumentation amplifier 264 generates a signal 230 in response to a magnitude difference between signal 218 and signal 220 and amplifier 274 generates signal 232 in response to a magnitude difference between signal 220 and signal 222. Therefore, due to the phase relationship between signal 218, signal 220, and signal 222, any difference in magnitude may be output as signal 232 by instrumentation amplifier 264 and as signal 232 by instrumentation amplifier 274. For example, if signal 218 was 1V and signal 220 was 1.5V, instrumentation amplifier 264 may output the voltage difference of 0.5V, or an amplified version thereof, as signal 230. Depending on the relative phase and magnitude shift, signal 230 and signal 232 may be output as an AC voltage. Signal 230 and signal 232 are input to window comparator 266 and window comparator 276, respectively, for processing thereof as described below.

Window comparator 266 receives and processes signal 230 and window comparator 276 receives and processes signal 232. In one embodiment, window comparator 266 compares the magnitude of signal 230 to a reference level or state, and window comparator 276 compares the magnitude of signal 232 to another reference level or state. When the magnitude of signal 230 exceeds a predefined threshold relative to the reference level or state, window comparator 266 outputs a logic signal 234 at a logic state indicative thereof, such as a logic ON state. When the magnitude of signal 232 exceeds a predefined threshold relative to the other reference level or state, window comparator 276 outputs a logic signal 236 at a logic state indicative thereof, such as a logic ON state. As illustrated, window comparator 266 and/or window comparator 276 may be used to measure the magnitude of signal 230 and the magnitude of signal 232 as a "full-wave" measurement meaning that the thresholds detected may be positive thresholds or negative thresholds (e.g., peak-to-peak) with respect to zero volts, for example. However, window comparator 266 may be used to measure the magnitude of signal 230, and/or window comparator 276 may be used to measure the magnitude of signal 232 as a "half-wave" measurement, meaning that only the positive or the negative thresholds are detected.

Figure 6:
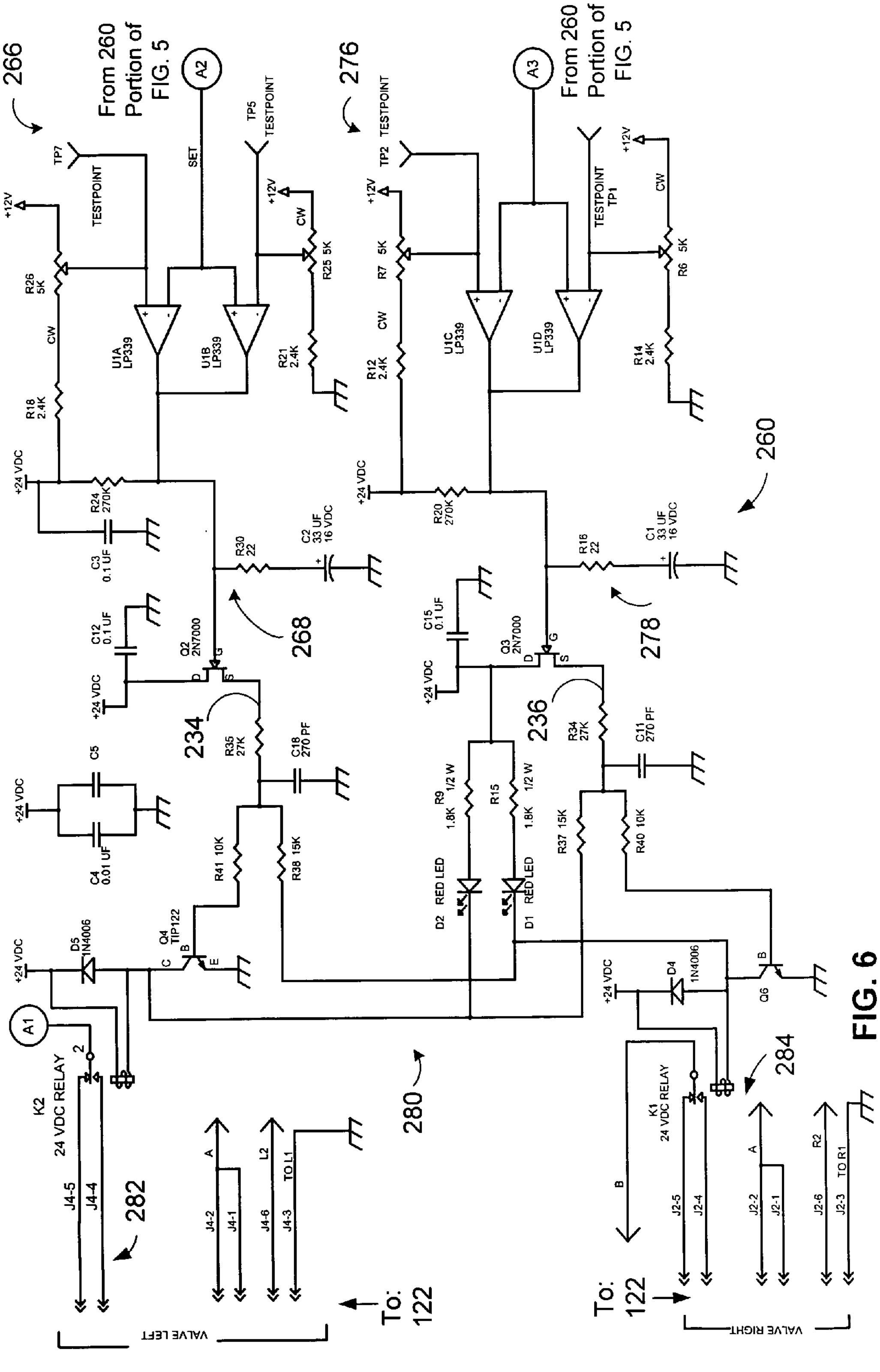

Window comparator 266 and window comparator 276 may use any suitable type of amplifiers, electrical components, or integrated circuits, such as operational amplifiers, and/or discrete components, and the like, to process signals. For example, as illustrated in FIG. 6, for full-wave detection, window comparator 266 include operational amplifier U1A and operational amplifier U1B, and window comparator 266 include operational amplifier U1C and operational amplifier U1D, adapted to generate signal 234 and 236 in response to signal 230 and 232, respectively. In one embodiment, for half-wave detection, only operational amplifier U1A and operational amplifier U1C, or operational amplifier U1B and operational amplifier U1D are needed to detect the threshold of respective signals 230 and 232.

In one embodiment, solution measurement circuit 260 is configured such that logic signal 234 is at one logic state when the property of the solution being dispensed from vessel 120A is outside a threshold value relative to a reference property measurement, and at a different logic state when the property of the solution being dispensed from vessel 120A crosses such threshold value. Similarly, solution measurement circuit 260 is configured such that logic signal 236 is at one logic state when the property of the solution being dispensed from vessel 120B is outside a threshold value relative to the reference property measurement, and at a different logic state when the property of the solution being dispensed from vessel 120B crosses such threshold value. In one embodiment, such reference property measurement value may be a logic value stored in computer readable media, such as RAM memory, or may be a measurement value of a property of the incoming fluid measured by sensor 126, such as a conductivity value, an opacity value, and the like.

In one embodiment, solution measurement circuit 260 is configured to select vessel 120A, or vessel 120B, until vessel 120A or vessel 120B is depleted of chemicals. However, in another embodiment, when neither vessel contains sufficient chemicals to provide a solution, solution measurement circuit 260 may be configured such that both logic signal 234, or logic signal 236 may be at a logic state adapted to select both vessel 120A and vessel 120B. For example, if solution measurement circuit 260 uses a logic ON state to select vessel 120A or vessel 120B to dispense solution, solution measurement circuit 260 may be configured such that both logic signal 234, or logic signal 236 may be set to a logic ON state. Thus, in this condition, both vessel 120A and vessel 120B are dispensing a solution.

Alternatively, to prevent dispensing a solution from either vessel 120A or 120B when they do not contain chemicals, or are depleted of chemicals, when solutions from both vessel 120A and vessel 120B cross their respective thresholds, solution measurement circuit 260 may be configured to provide a logic level, such as a logic OFF state to both logic signal 236 and logic signal 234, to prevent both vessel 120A and vessel 120B from dispensing solution. This is advantageous, as it prohibits either vessel 120A or vessel 120B from dispensing a diluted solution when vessel 120A and vessel 120B have insufficient chemicals.

Signal 234 is applied to low pass filter 268 and signal 236 is applied to low pass filter 278 to establish a vessel selection response period. In one embodiment, low pass filter 268 and low pass filter 278 are configured to set a response time (i.e. bandwidth) for selecting vessel 120A or 120B in response to signal 234 and signal 236. A resistor-capacitor (RC) time constant may be set by setting a pole or zero in the frequency domain that provides a predetermined response time (i.e. bandwidth) in the time domain. For example, a RC time constant may be set to establish a response of several seconds before a logic state change of either signal 234 or signal 234 is passed through low pass filter 268 and low pass filter 278 to set-reset flip flop 280. In one embodiment, such response time may be between about zero seconds and sixty seconds, or longer.

Low pass filter 268 and low pass filter 278 may be configured using virtually any passive or active elements that may be used to advantage. For example, as illustrated in FIG. 6, low pass filter 268 may be configured using resistor R24 and capacitor C2, and low pass filter 278 may be configured using resistor R20 and capacitor C1. While a single-pole low pass filters are illustrated, those skilled in the art will appreciate that a plurality of filter configurations may be used having a number of electrical elements capable of providing different filter bandwidths and RC time constants.

In one embodiment, set-reset flip-flop 280 provides a control signal 282 and a control signal 284 in response to the logic states of signal 234 and signal 236, respectively. Control signal 282 and control signal 284 are coupled to fluid section control 122 to control the selection of vessel 120A and vessel 120B. For example, when set to a logic ON state, control signal 282 may instruct fluid section control 122 to select coupling the incoming fluid to vessel 120A. Similarly, when set to a logic ON state, control signal 284 may instructs fluid section control 122 to select vessel 120B to receive the incoming fluid.

Set-reset flip-flop 280 may be configured to latch the logic state of control signal 282 and control signal 284 in response to the logic states of signal 234 and signal 236, respectively. For example, before latching, when signal 234 is at a logic ON state, and signal 236 is at a logic OFF state, the logic state of control signal 282 will latch to a logic ON state until the logic state of signal 234 is set to a logic OFF state. Similarly, before latching, if signal 236 is at a logic ON state, and signal 234 is at a logic OFF state, the logic state of control signal 284 will latch to a logic ON state until the logic state of signal 236 is at a logic OFF state. This is advantageous, as such a latching function ensures that fluctuations in signals due to noise from sensors not being used, and other circuits, do not inadvertently disrupt the flow of solution from the selected vessel 120A or vessel 120B, until the property of the dispensing solution from the selected vessel crosses the predefined threshold, as described herein.

Set-reset flip-flop 280 may use any type of suitable amplifiers, electrical components, or integrated circuits, such as flip-flops (bi-stable, etc.), and/or discrete components, and the like, to process signals. For example, as illustrated in FIG. 6, set-reset flip-flop 280 includes transistor Q2 and transistor Q4 to generate control signal 282 and transistor Q3 and transistor Q6 to generate control signal 284. In one embodiment, transistor Q4 and transistor Q6 are cross-coupled though resistor R37 and resistor R38 to enable latching of set-reset flip-flop 280 as described further below.

As illustrated in FIG. 6, in one embodiment, when logic signal 234 is applied to the gate of transistor Q2, the base of BJT transistor Q4 is biased through Q2 to an ON state which activates DC relay K2. DC relay K2 then generates control signal 282 at an ON state controlling fluid switching control 122 to couple incoming fluid to vessel 120A. As the collector of transistor Q6 is cross-coupled to transistor Q4 via a voltage divider network of cross-coupling resistor R38, a resistor R35, and a resistor R41, when logic signal 236 is OFF, and logic signal 234 is ON, transistor Q4 is latched to an ON state, latching DC relay K2 ON.

Similarly, before latching, when logic signal 236 is applied to the gate of transistor Q3 in a logic ON state, the base of BJT transistor Q6 is biased though transistor Q3 to an ON state which activates DC relay K1. DC relay K1 then generates control signal 284 at an ON state to control fluid switching control 122 to couple incoming fluid to vessel 120B. As the collector of transistor Q4 is cross-coupled to transistor Q6 via voltage divider network of a cross-coupling resistor R37, resistor R40, a resistor R34, when logic signal 234 is in an OFF state, and logic signal 236 is in an ON state, transistor Q6 is latched to an ON state, latching DC relay K1 ON. In the above latching cases, the latched dispensing state of vessel 120A or vessel 120B will not prevent other non-latched vessel from activating. For example, if vessel 120A was dispensing solution in a latched condition via latching DC relay K2, DC relay K1 may be activated or deactivated, thereby allowing vessel 120B to dispense a solution at the same time.

In one embodiment, when the property of the solution from both vessel 120A and vessel 120B, are both above a predefined limit of the incoming fluid property, the cross coupling of transistor Q4 and transistor Q6 allows either DC relay K1 or DC relay K2 to latch, but not both, depending on which relay was latched prior to the solutions being within a predefined limit of the incoming fluid. For example, if solution measurement circuit 260 detected vessel 120A containing a solution above the predefined threshold limit before vessel 120B, DC relay K2 would be latched ON, and therefore vessel 120A would be latched ON until the property of the solution from vessel 120A crossed below the limit. Due to this latching function, when vessel 120A is depleted of chemical and vessel 120B has sufficient chemicals to dispense a solution, DC relay K2 is unlatched by the logic signal 234 moving from an ON state to an OFF state. DC relay K2 then sets control signal 282 to an OFF state, deselecting vessel 120A. Similarly, when vessel 120B is depleted of chemicals and vessel 120A has sufficient chemicals to dispense a solution, DC relay K1 is unlatched by the logic signal 236 moving from an ON state to an OFF state. Then, DC relay K1 sets control signal 284 to an OFF state, deselecting vessel 120B. This latching process encourages latching either vessel 120A or vessel 120B to dispense their respective solutions until the vessels are depleted of chemicals.

In another embodiment, if vessel 120A and vessel 120B do not have sufficient chemicals to dispense a solution that has a property outside the threshold limit, DC relay K2 and DC relay K1 may be set to an ON state, permitting flow of incoming fluid to both vessel 120A and vessel 120B, until either vessel 120A, or vessel 120B, are refilled with chemicals. Alternatively, DC relay K2 and DC relay K1 may be set to an OFF state, disrupting flow of incoming fluid to both vessel 120A and vessel 120B, until either vessel 120A, or vessel 120B, are refilled with chemicals.

When both DC relay K1, and DC relay K2 are active, indicating that both vessel 120A and vessel 120B are dispensing a solution that is below the predefined limit, neither DC relay K1 nor DC relay K2 will be latched until solution measurement circuit 260 determines that the solution being dispensed from vessel 120A or vessel 120B is above the predetermined threshold.

In one embodiment, after replacing chemicals in vessel 120A, or 120B, or both, controller 110 may reset solution measurement circuit 260 to select either vessel 120A or 120B as above. However, if both vessels are filled with chemicals, controller 110 may initiate a default condition selecting either vessel 120A or 120B to begin dispensing chemicals. In one embodiment, an alert signal, such as LEDs D1 and D2, may be used to alert a user that vessel 120A and vessel 120B are out of chemicals, for example, when both LED D1 and LED D2 are lit, or are not lit.

Figure 7:
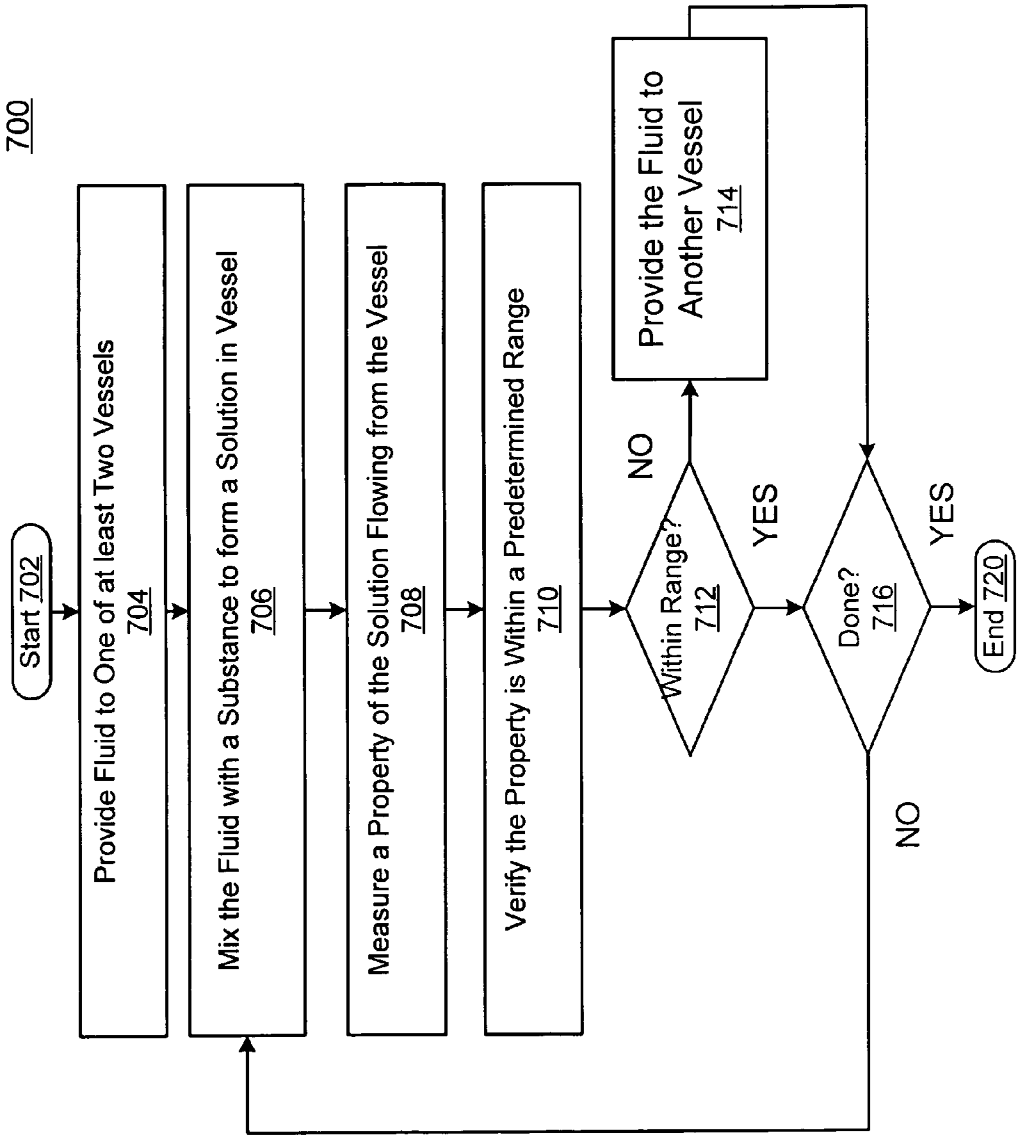
FIG. 7 is a high-level flow diagram illustrating one embodiment of a method of dispensing a solution from a plurality of vessels in accordance with embodiments of the invention.

FIG. 7 is a high-level flow diagram illustrating one embodiment of a method 700 of dispensing a solution from a plurality of vessels such as vessel 120A and vessel 120B. In one embodiment, method 700 may be entered into at step 702 when, for example, multi-vessel chemical dispensing system 100 is activated. At step 704, an incoming fluid is provided to one of at least two vessels. For example, referring to FIG. 1, fluid is coupled to vessel 120A or vessel 120B using, for example, electrically operated valves controlling the fluid from external fluid source 118 through incoming fluid control 124 and fluid selection control 122. In one embodiment, at an initial start-up or power-loss condition, controller 110 may select either vessel 120A or vessel 120B.

In one embodiment, the incoming fluid is mixed with one or more chemicals stored in the selected vessel at step 706. For example, considering vessel 120A is selected to dispense a solution, the incoming fluid is mixed with one or more chemicals stored in vessel 120A to form a solution. At step 708, a property of the solution being dispensed from vessel 120A is measured before it reaches solution receiving region 170. For example, circuit 200 may be used to measure the conductivity or opacity of the solution, and control dispensing the solution. In one embodiment, method 700 employs oscillator 210 to generate signal 216 which is coupled to sensor 126 and sensor 152. Sensor 126 generates signal 220, and sensor 152 generates signal 218 in response to signal 216. In one embodiment, signal 218 and signal 220 vary as a function of the conductivity of the fluid and solution, respectively, for example, to measure conductivity of the incoming fluid and the conductivity of the solution being dispensed from vessel 120A.

At step 710, method 700 determines if the property of the solution being measured is within a predefined range. For example, circuit 200 may be used to determine if the conductivity of the solution being dispensed is within a predefined range of the conductivity of the incoming fluid. If the solution is within the predefined range, then method 700 proceeds to step 716. If at step 716, dispensing a solution is finished, the process ends at step 720. If however it is determined at step 712 that the property of the solution is not within the predefined range, method 700 proceeds to step 714. At step 714, method 700 selects another vessel to dispense a solution, such as vessel 120B. For example, circuit 200 may be used switch the incoming fluid from vessel 120A to vessel 120B. Method 700 proceeds to step 716 to determine if dispensing fluid should continue. If so, method 700 returns to step 706-712 to generate and determine if the solution from the other vessel (e.g., vessel 120B) is within the predefined range. If not, method 700 ends at step 720.

Figure 8:
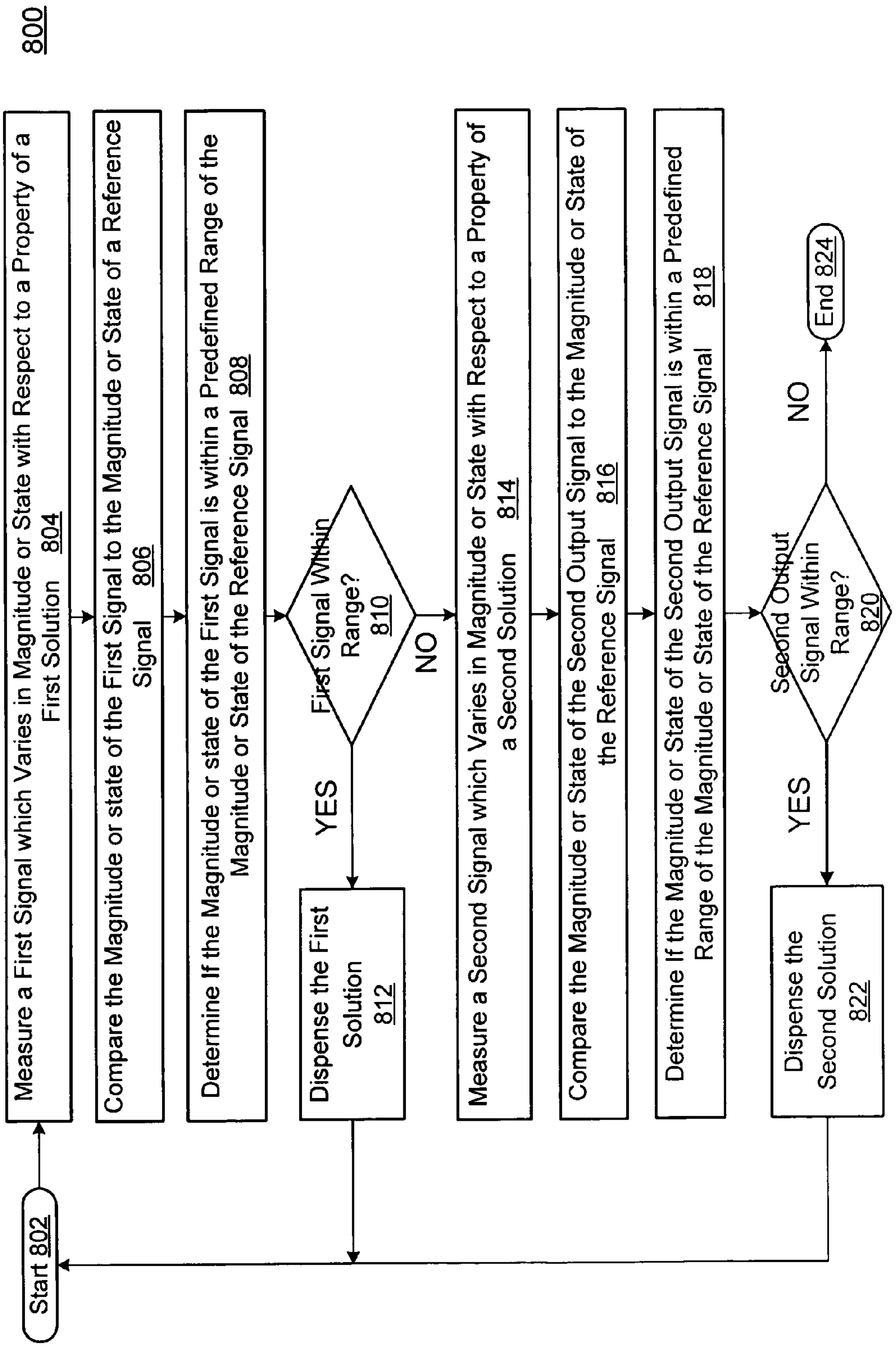
FIG. 8 is a high-level flow diagram illustrating one embodiment of a method of determining which solution to dispense from a multi-vessel chemical dispensing system in accordance with embodiments of the invention.

FIG. 8 is a high-level flow diagram illustrating one embodiment of a method 800 of determining which solution to dispense from a multi-vessel chemical dispensing system 100. In one embodiment, method 800 may be entered into at step 802 when, for example, multi-vessel chemical dispensing system 100 is activated. At step 804, a first signal responsive to a property of a first solution is measured with respect to magnitude or a state of a reference signal. For example, referring to FIG. 1 and FIG. 2, if signal 218 represents a measurement of a first solution from vessel 120A. The measured magnitude or state is then compared at step 806 to a reference signal magnitude or state. For example, signal 220, which may represent a measurement of a reference fluid, such as the incoming fluid. At step 808, method 800 determines if the magnitude or state of the first signal is within a range of the reference signal magnitude or state. At step, 810, if the magnitude or state of the first signal is within the range, then method 800 proceeds to step 812 to dispense the first solution from vessel 120A. For example, if according to steps 804-810, solution measurement circuit 260 compares signal 218 to signal 220 and determines that they are within a predefined range of each other, vessel 120A is allowed to dispense a solution at step 814. If however, at step 810, if the magnitude or state of the first signal is not within the range, then method 800 proceeds to step 814.

At step 814, a second signal responsive to a property of a second solution is measured with respect to magnitude or a state of a reference signal. For example, referring to FIG. 1 and FIG. 2, if signal 222 represents a measurement of a second solution from vessel 120B. The measured magnitude or state is then compared at step 818 to a reference signal magnitude or state. For example, signal 220, which represents a measurement of a reference fluid such as the incoming fluid. At step 818, method 800 determines if the magnitude or state of the second signal is within a range of the reference signal magnitude or state. At step, 820, if the magnitude or state of the second signal is within the range, then method 800 proceeds to step 822 to dispense the second solution from vessel 120B. For example, if at steps 814-820, solution measurement circuit 260 compares signal 222 to signal 220, and determines that they are within a predefined range of each other, vessel 120B is selected to dispense a solution at step 822. If however, at step 820, the magnitude or state of the second signal is not within the predefined range, then method 800 proceeds to step 824 and ends.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A circuit comprising:

a signal monitoring circuit configured to:

monitor a property of a first signal from a first sensor positioned to monitor a property of a first solution, wherein the property of the first signal varies as a function of the property of the first solution, monitor a property of a second signal from a second sensor positioned to monitor a property of a second solution, wherein the property of the second signal varies as a function of the property of the second solution; and a control circuit configured to compare the property of the first signal and the property of the second signal to a property of a reference signal to determine whether to provide a first control signal for dispensing the first solution, or provide a second control signal for dispensing the second solution, wherein the control circuit comprises a latching circuit configured to latch one of either the first control signal or the second control signal until the property of the solution being dispensed crosses a predefined threshold, then latching the other of the first control signal or the second control signal so that the other solution is dispensed until the property of the other solution for which the control signal is now latched crosses the predefined threshold.

2. The circuit of claim 1, wherein the property of the first solution or the property of the second solution comprises conductivity or opacity.

3. The circuit of claim 1, wherein the monitoring circuit comprises a signal comparison circuit configured to generate an output signal in response to a comparison between the property of first signal and the property of the reference signal.

4. The circuit of claim 1, wherein the monitoring circuit comprises a signal comparison circuit configured to generate an output signal in response to a comparison between the property of second signal and the property of the reference signal.

5. The circuit of claim 1, wherein the control circuit comprises filter circuit configure to establish a response time of the control circuit.

* * * * *